C. A. GEE.
EXHIBITING AND ADVERTISING APPARATUS.
APPLICATION FILED JAN. 4, 1909.

969,780.

Patented Sept. 13, 1910.

3 SHEETS—SHEET 1.

Witnesses—
Stanley Wood
H. Cox

Inventor
Charles Abram Gee
by
W. E. Evans.
Attorney.

C. A. GEE.
EXHIBITING AND ADVERTISING APPARATUS.
APPLICATION FILED JAN. 4, 1909.

969,780.

Patented Sept. 13, 1910.

3 SHEETS—SHEET 3.

Witnesses—
Herbert William Cox.
Lionel Ernest Bussey.

Inventor
Charles Abram Gee.
by
Attorney.

UNITED STATES PATENT OFFICE.

CHARLES ABRAM GEE, OF SOUTH TOTTENHAM, LONDON, ENGLAND.

EXHIBITING AND ADVERTISING APPARATUS.

969,780.  Specification of Letters Patent.  Patented Sept. 13, 1910.

Application filed January 4, 1909. Serial No. 470,620.

*To all whom it may concern:*

Be it known that I, CHARLES ABRAM GEE, subject of the King of Great Britain and Ireland, and residing at 9 Broad Lane, South Tottenham, London, N., England, have invented certain new and useful Improvements Relating to Exhibiting and Advertising Apparatus, of which the following is a specification.

This invention relates to exhibiting and advertising apparatus and has for its object to provide mechanism for successively exposing a series of pictures so as to produce a moving picture and in such manner that the succession of pictures may be continuously or intermittently reproduced and so that a relatively small number of pictures need be used and in such a manner that a clear impression shall be presented to the eye.

According to the invention I provide a number of sets of plates or pictures of a number in each set corresponding to the number of representations composing the series and I so mount each set of plates or pictures that the sets representing a complete picture successively come into position within a suitable frame in line one with the other on the rotation or movement of a frame or frames carrying them.

According to the invention with a view to minimizing the number of plates employed I provide the constituent pictures in sets one on each side of the plates so that thus each one of the plates or frames carrying the constituent parts of the pictures, on the rotation or movement of the carrying frame may turn back foremost and thus on the movement of each plate of each set an entirely new picture is presented.

According to the invention I provide a rotating frame for carrying each set of plates or pictures in such manner that the plates may turn upon their own axes under the influence of cam plates, or other suitable means and that their axes may move in a determined path so that two of the plates may at one time be brought into alinement one with the other and according to the invention two of the plates may successively be brought into alinement within an aperture on each side of a fixed containing frame so that thus two representations may at the same time be given.

The invention comprises constructional details which are hereinafter more particularly described and illustrated in the accompanying drawings in which—

Figure 1:
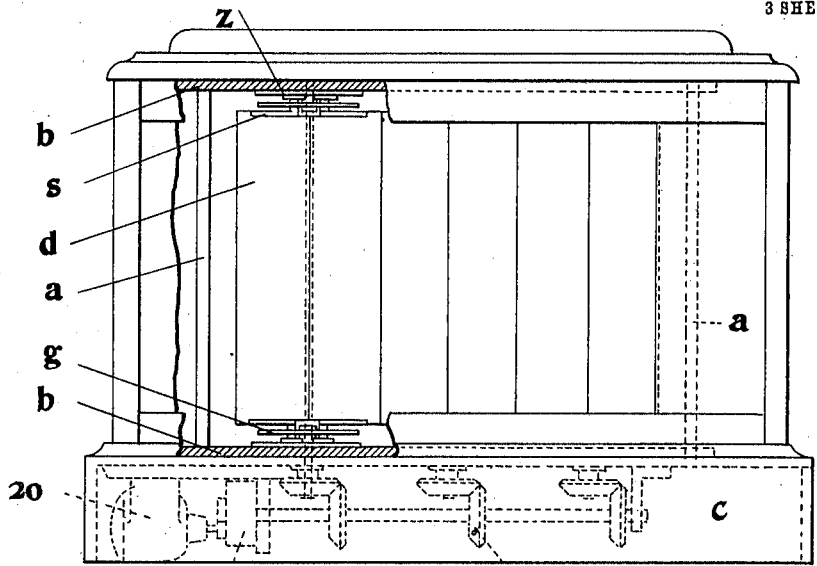
Figure 2:
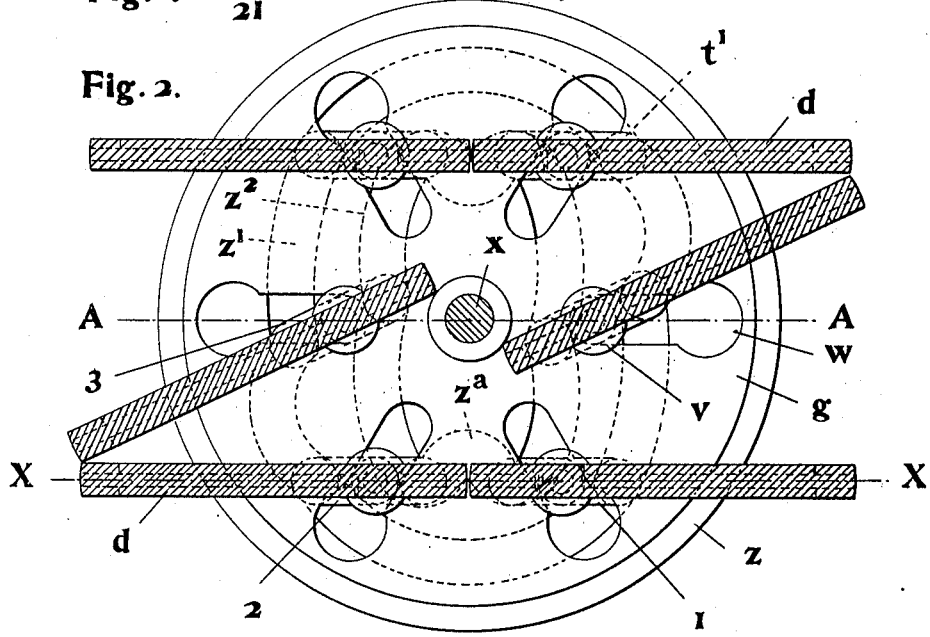
Figure 3:
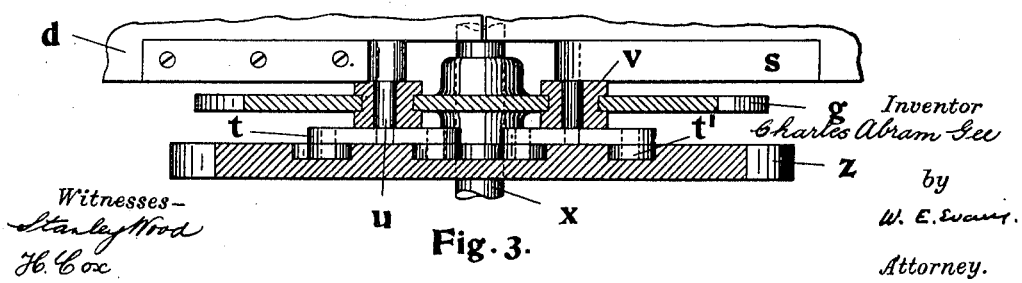
Figure 5:
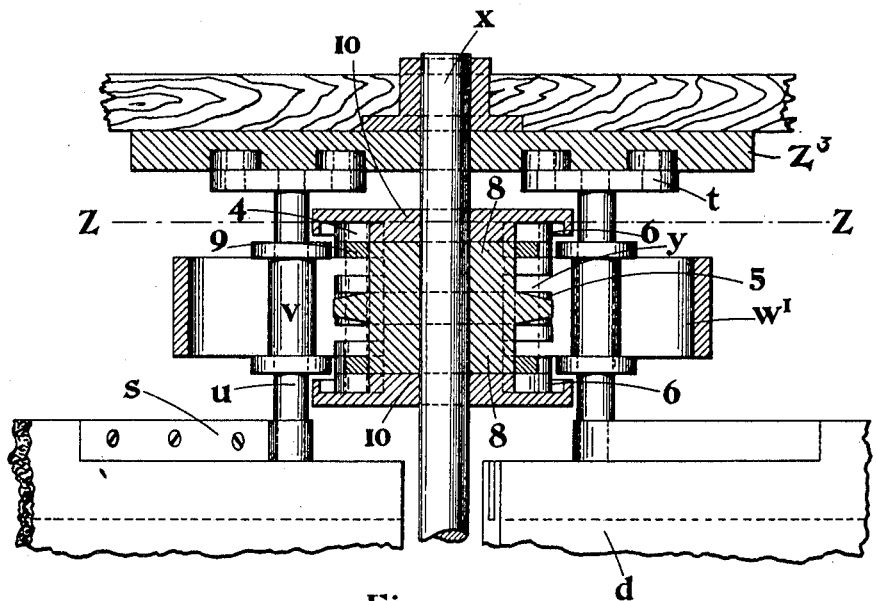
Figure 4:
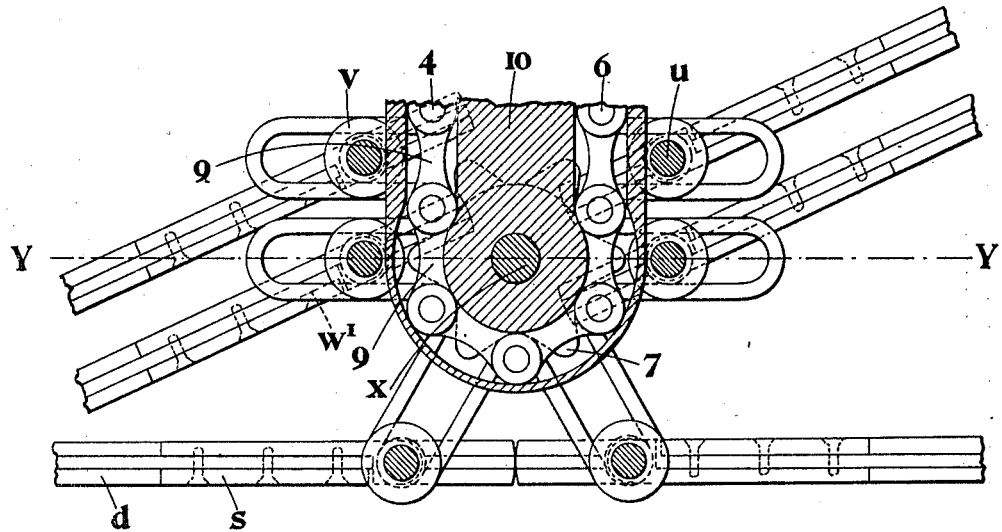
Figure 7:
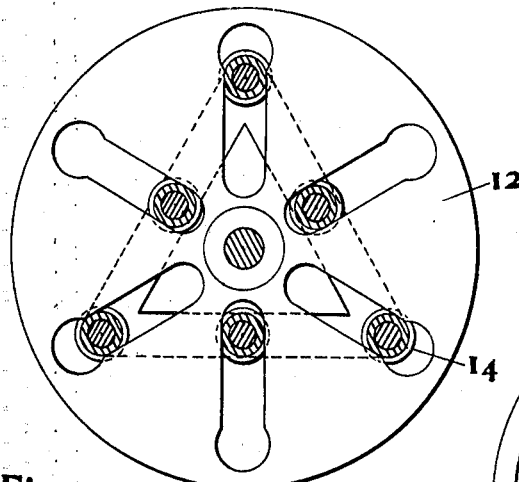
Figure 10:
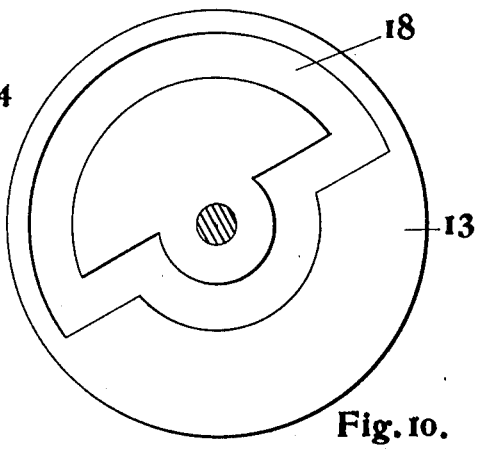
Figure 6:
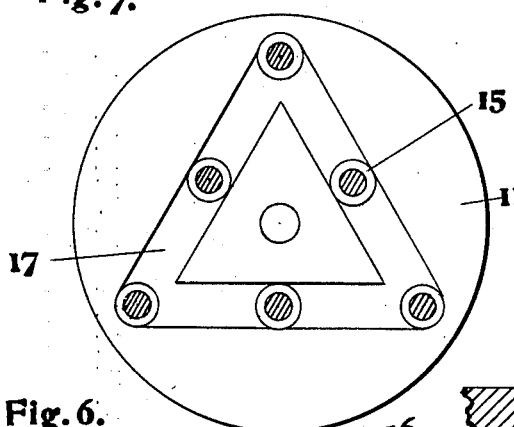
Figure 9:
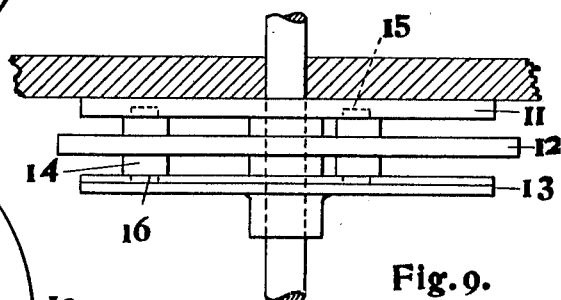
Figure 8:
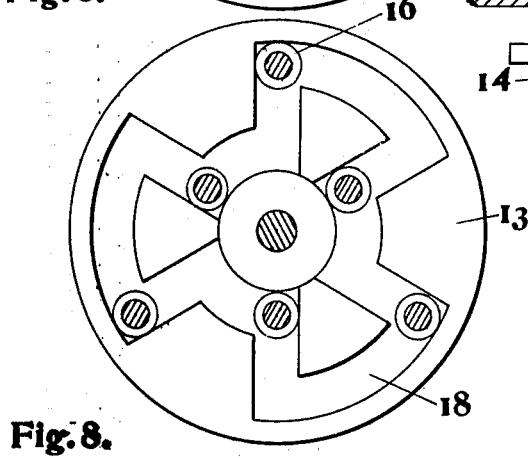

Figure 1 is an elevation of the apparatus. Fig. 2 is a detail plan, drawn to a larger scale, of a circular rotating supporting plate and a cam plate for a unit having six picture plates, showing the position occupied by the cam arms and the plates to be exposed. Fig. 3 is a sectional elevation taken on the line $x\ x$ of Fig. 2. Fig. 4 is a detail plan of an alternative mechanism, replacing the rotating supporting plate, as used upon a unit having a large number of picture plates. Fig. 5 is a sectional elevation taken upon the line $y\ y$ of Fig. 4 showing also the disposition of the cam plate and cam arms. Figs. 6, 7, 8 are respectively plans of the stationary plates, intermittently rotating plate and the constantly rotating plate of the exposure control mechanism as arranged for a 2:1 exposure. Fig. 9 is an elevation corresponding thereto. Fig. 10 is a plan of the constantly rotating plate as provided for an exposure in the ratio 3:1.

The apparatus is advantageously constructed of a number of separate units simultaneously operating so that the corresponding plates $d$ in each unit may be simultaneously brought into position to be exposed.

According to the construction illustrated in Figs. 1, 2 and 3, I provide a fixed frame preferably consisting of four vertical rods $a$ mounted between horizontal plates $b$ at the top and bottom of the frame, said frame being fixedly mounted on any suitable base $c$ and, if desired, inclosed within a suitable ornamental covering. Within the frame are mounted any convenient number of vertical plates $d$ which serve the purpose of displaying advertisements, pictures or the like.

Each plate $d$, which may be of wood, light metal, or a canvas or fabric covered framework or of other suitable construction, is mounted, top and bottom in plate holders $s$ which are fixed to cam arms $t$, the connecting spindle $u$ forming a bearing for a roller $v$ which is grooved to engage with a radial slot $w$ provided in the rotating plate $g$ which is fixedly mounted upon the spindle $x$. The cam arms $t$ carry rollers $t'$ which engage with the cam grooves $z'\ z^2$ provided upon the cam plates $z$ which are fixed to the plates $b$ of the framework. The cam grooves $z'\ z^2$ are so designed that when the cam arms pass the portions of the grooves indicated $z^a$ they are rotated through 180°, that is, from the position 1 to the position 2, (Fig. 2) thus exposing in turn the two sides of the picture plates. In operation upon the rotation of the spindle $x$ the rotating plate $g$ revolves the picture plates about the axis of the spindle, while the cam grooves $z'$ $z^2$, by means of the cam arms $t$, constrain the rollers $v$ to move inwardly or outwardly within the radial slots $w$ so that the picture plates of one unit may clear the corresponding plates of the adjacent unit, and at the same time operate to bring the plates successively into their position of exposure as hereinbefore described, where two of the plates of one unit will be in line.

In the mechanism as illustrated in Figs. 4 and 5, which is intended for a unit having a large number of picture plates, the rotating plate is replaced by a chain mechanism each link of which consists of a U shaped member $w'$ provided to carry the grooved roller $v$ and fulfilling the function of the radial slot of the rotating plate in the mechanism before described. They are pivoted together through the integrally formed lugs $y$, by means of pins 4 carrying rollers 5, 6. The rollers 5 engage with a driving spur wheel or member 7 secured to the spindle $x$. The wheel 7 has projecting cylindrical bosses 8 which serve as bearing surfaces to the links 9 of what may be called steadying and strengthening chains, the said links having their edges formed to arcs of a circle of the same diameter as the bosses 8 and being also pivoted together by the pins 4.

The rollers 6 are adapted to engage with the continuous grooves formed in the two plates 10 which are secured to the framework of the apparatus, the length of the grooves being determined by the number of links $w'$ in the chains.

The cam arms $t$ and plate holders $s$ are of similar form to those of the mechanism previously described but the connecting spindles $u$ are lengthened.

The cam plates $z^3$, whose grooves are of a corresponding length to the grooves of the plates 10, are of similar design to that shown in Fig. 2, consisting of the two halves, as indicated by the line A A, connected together by a portion of plate, having parallel or other suitable grooves, of a length determined by the number of picture plates in the unit.

The function of the members or links $w'$ may alternatively be carried out by slotted plates of suitable design, in which case, the chain merely serves the purpose of connecting the plates $d$ together.

By thus describing the movement of one of the constituent plates or pictures the operation of each unit will be understood.

In the unit before described two plates will be successively exposed on each side of the fixed unit frame while in a case where there are 12 pictures and six picture frames or holders, two will be passing in opposite directions on opposite sides of the casing while two are being exposed at each side thereof. It will however be understood that any number of frames may be employed corresponding to the number of pictures it is desired to use and where a relatively great number of pictures are used the shape of the slots in which the pivots or spindles of the frames move is such as to insure that the edges of the picture may not contact with each other or with any part in their movement in opposite direction across the casing and shall moreover be such that the pivots will freely move in the slots on the rotation of the spindle upon which the frame carrying the sets of pictures is mounted.

The synchronic rotation of the respective rotating parts of each unit in any form of the apparatus is effected by gearing them to rotate together by means of worm or spur gearing, cord or belt or chain passing around pulleys or by other suitable gearing, 19, 21, which will insure the perfect alinement of the picture plates of the several units in the exposure and movement of the mechanism may be effected by a small electric motor 20 or manually or from any source of motive power. It will however be understood that the invention is not limited to an apparatus involving two exposures nor to a fixed casing for each unit as hereinbefore described as a frame may be provided for one exposure and the wall of the casing in such event may be such as would be suitable according to the path of the pivot or spindles.

In order to secure intermittent movement of the picture plates in any one of the forms of apparatus described so that each plate shall remain stationary in the exposure position for a brief period, an exposure control mechanism, as illustrated in Figs. 6, 7, 8, 9 and 10 is provided intermediate of the driving power and the spindles $x$ as at 21. This mechanism consists of three plates 11, 12, 13 the plate 12 being the driven member and having intermittent rotation which is communicated to the picture plates, while one of the remaining plates, say 13, acts as the driving member of the mechanism and is connected directly or through gearing with the motor, and the other plate 11 is fixably mounted upon the frame of the apparatus. The plate 12 is provided with radial slots in which rollers or sliding pieces 14 engage and upon whose spindles or pins are provided rollers 15, 16 for engagement respectively with cam grooves 17, 18, provided on the plates 11 and 13.

The ratio of the time of exposure to that of movement is determined by the form of groove provided upon the plate 13, the plate as illustrated in Fig. 8 serving to secure a 2:1 exposure while the plate as in Fig. 10 provides a 3:1 exposure. The plate 11 serves to control the movement of the sliding pieces or rollers 14 along the radial slots of the plate 12 and the movement of the rollers 16 along the radial portions of the cam grooves 18 of the plate 13. The limbs of the groove 17 may be straight, curved or partly straight and partly curved, but in every case the width at the angles should not be much greater than the diameter of the rollers 15.

In operation, when the plate 13 is constantly rotating, the rollers 16 engaging the groove 18, will impart no motion to the plate 12 while engaged with the circular portions of the groove and consequently the spindle or spindles $x$ are stationary and an exposure is obtained. During this period the rollers 15 will be at the angular portion of the groove 17 of the plate 11. Upon the rollers 16 entering the radial portions of the groove 18 they are revolved about the axis of the control mechanism by the plate 13 and transmit this movement to the plate 12 and thence to the spindle or spindles $x$, thus causing movement of the plates.

In order to secure more efficient action, the cam groove 17 may be so designed that the rollers 15 are arrested just before reaching the angular portions. This necessitates the extension of the radial portions of the cam groove 18, along which the rollers 16 pass inward, toward the circumference, so that the rollers 15 may, at these points, move first outwardly to a slight extent and then inwardly.

What I claim as my invention and desire to secure by Letters Patent is:—

1. Exhibiting and advertising apparatus comprising movable slotted members, picture plates having their axes mounted in the slotted members, means for moving the slotted members, and means for rotating the picture plates about their own axes substantially as described.

2. Exhibiting and advertising apparatus comprising movable slotted members, picture plates having their axes mounted in the slotted members, means for moving the slotted members, and means for rotating the picture plates about their own axes and means for controlling the time exposure of the picture plates substantially as described.

3. Exhibiting and advertising apparatus comprising a rotatable frame, picture plates mounted in the frame, means for rotating the frame and means for rotating the picture plates about their own axes said means consisting of a radially slotted plate and a plate provided with a cam groove for guiding the axes of the picture plates substantially as described.

4. Exhibiting and advertising apparatus comprising a rotatable frame, means for rotating the frame, picture plates mounted in the frame, spindles upon which the picture plates are mounted, rotatable arms mounted on the spindles, rollers mounted on the rotatable arms, fixed plates provided with cam grooves in which latter the rollers are guided and radially slotted plates attached to the frame by which the spindles of the picture plates are guided substantially as described.

5. Exhibiting and advertising apparatus comprising picture plates, a frame carrying the picture plates, means for rotating the frame, means for controlling the time of exposure of the plates and means for rotating the picture plates about their own axes consisting of a plate having a double cam groove in which latter the axes of the picture plates are guided substantially as described.

6. Exhibiting and advertising apparatus comprising a rotatable frame, picture plates mounted in the frame, means for rotating the frame and means for rotating the picture plates about their own axes and means for controlling the time exposure of the picture plates, said means comprising an intermittently rotating disk having radial slots, two disks each having a cam groove, one of said disks being fixed and the other constantly rotated and means for rotating the intermittently rotating disk substantially as described.

7. Exhibiting and advertising apparatus comprising a rotatable frame, picture plates mounted in the frame, means for rotating the frame and means for rotating the picture plates about their own axes said means consisting of a radially slotted plate and a plate provided with a cam groove for guiding the axes of the picture plates, and means for controlling the time exposure of the picture plates substantially as described.

8. Exhibiting and advertising apparatus comprising a rotatable frame, picture plates mounted in the frame, means for rotating the frame and means for rotating the picture plates about their own axes said means consisting of a radially slotted plate and a plate provided with a cam groove for guiding the axes of the picture plates and means for controlling the time exposure of the picture plates, said means comprising an intermittently rotating disk having radial slots, two disks each having a cam groove, one of said disks being fixed and the other constantly rotated and means for rotating the intermittently rotating disk substantially as described.

9. Exhibiting and advertising apparatus comprising a rotatable frame, means for rotating the frame, picture plates mounted in the frame, spindles upon which the picture plates are mounted, rotatable arms mounted on the spindles, rollers mounted on the rotatable arms, fixed plates provided with cam grooves in which latter the rollers are guided and radially slotted plates attached to the frame by which the spindles of the picture plates are guided and means for controlling the time exposure of the picture plates substantially as described.

10. Exhibiting and advertising apparatus comprising a rotatable frame, means for rotating the frame, picture plates mounted in the frame, spindles upon which the picture plates are mounted, rotatable arms mounted on the spindles, rollers mounted on the rotatable arms, fixed plates provided with cam grooves in which latter the rollers are guided and radially slotted plates attached to the frame by which the spindles of the picture plates are guided and means for controlling the time exposure of the picture plates, said means comprising an intermittently rotating disk having radial slots, two disks each having a cam groove, one of said disks being fixed and the other constantly rotated, and means for rotating the intermittently rotating disk substantially as described.

11. Exhibiting and advertising apparatus comprising picture plates, a frame carrying the picture plates, means for rotating the frame, means for controlling the time of exposure of the plates and means for rotating the picture plates about their own axes consisting of a plate having a double cam groove in which latter the axes of the picture plates are guided, and means for controlling the time exposure of the picture plates substantially as described.

12. Exhibiting and advertising apparatus comprising picture plates, a frame carrying the picture plates, means for rotating the frame, means for controlling the time of exposure of the plates and means for rotating the picture plates about their own axes consisting of a plate having a double cam groove in which latter the axes of the picture plates are guided, and means for controlling the time exposure of the picture plates, said means comprising an intermittently rotating disk having radial slots, two disks each having a cam groove, one of said disks being fixed and the other constantly rotated, and means for rotating the intermittently rotating disk substantially as described.

13. Exhibiting and advertising apparatus comprising movable slotted members, picture plates having their axes mounted in the slotted members, means for moving the slotted members, and means for rotating the picture plates about their own axes, and means for controlling the time exposure of the picture plates substantially as described.

14. Exhibiting and advertising apparatus comprising movable slotted members, picture plates having their axes mounted in the slotted members, means for rotating the picture plates about their own axes, and means for controlling the time exposure of the picture plates, said means comprising an intermittently rotating disk having radial slots, two disks each having a cam groove, one of said disks being fixed and the other constantly rotated, and means for rotating the intermittently rotating disk substantially as described.

In testimony whereof I have hereunto signed my name to this specification in the presence of two subscribing witnesses.

CHARLES ABRAM GEE.

Witnesses:
  LIONEL ERNEST BUSSEY,
  H. D. JAMESON.